(12) United States Patent
Belkadi et al.

(10) Patent No.: US 8,480,037 B2
(45) Date of Patent: Jul. 9, 2013

(54) DEVICE FOR DETERMINING THE POSITION OF A THROTTLE LEVER IN AN AIRCRAFT

(75) Inventors: Jean-Francois Belkadi, Toulouse (FR); Richard Ambroise, Merville (FR)

(73) Assignee: Airbus Operations, Toulouse (FR)

(*) Notice: Subject to any disclaimer, the term of this patent is extended or adjusted under 35 U.S.C. 154(b) by 248 days.

(21) Appl. No.: 12/997,682

(22) PCT Filed: Jul. 10, 2009

(86) PCT No.: PCT/FR2009/000857
§ 371 (c)(1),
(2), (4) Date: Dec. 13, 2010

(87) PCT Pub. No.: WO2010/007249
PCT Pub. Date: Jan. 21, 2010

(65) Prior Publication Data
US 2011/0093140 A1    Apr. 21, 2011

(30) Foreign Application Priority Data
Jul. 17, 2008 (FR) .................................. 08 04066

(51) Int. Cl.
*B64C 13/50* (2006.01)

(52) U.S. Cl.
USPC .......... 244/228; 701/103; 701/104; 701/110; 74/491; 60/39.281

(58) Field of Classification Search
None
See application file for complete search history.

(56) References Cited

U.S. PATENT DOCUMENTS

| 4,567,786 | A | | 2/1986 | Sakurai |
| 4,597,049 | A | * | 6/1986 | Murakami ............... 701/110 |
| 4,612,615 | A | * | 9/1986 | Murakami ............... 701/110 |
| 5,029,778 | A | * | 7/1991 | DeLuca ................... 244/234 |
| 5,125,602 | A | | 6/1992 | Vauvelle |
| 5,146,892 | A | * | 9/1992 | Krampe et al. ........... 123/399 |
| 5,445,126 | A | * | 8/1995 | Graves, Jr. .............. 123/399 |
| 5,488,824 | A | | 2/1996 | LeDoux et al. |
| 5,489,830 | A | * | 2/1996 | Fernandez ............... 318/628 |
| 5,654,888 | A | * | 8/1997 | Muller et al. ............. 701/54 |
| 5,816,100 | A | * | 10/1998 | Fowler et al. ............. 74/335 |
| 6,151,542 | A | * | 11/2000 | Yoshino et al. ........... 701/54 |
| 6,414,607 | B1 | * | 7/2002 | Gonring et al. .......... 341/20 |
| 6,443,399 | B1 | * | 9/2002 | Yount et al. ............. 244/196 |
| 6,512,344 | B1 | * | 1/2003 | Konno et al. ........... 318/560 |
| 6,642,685 | B2 | * | 11/2003 | Onodera ............... 318/568.16 |
| 6,704,643 | B1 | * | 3/2004 | Suhre et al. ............. 701/115 |
| 6,937,033 | B2 | * | 8/2005 | Boronkay et al. ........ 324/714 |
| 7,032,570 | B2 | * | 4/2006 | Watanabe et al. ........ 123/399 |

(Continued)

OTHER PUBLICATIONS

International Search Report issued Feb. 2, 2010 in PCT/FR09/00857 filed Jul. 10, 2009.

*Primary Examiner* — Thomas Tarcza
*Assistant Examiner* — Richard Goldman
(74) *Attorney, Agent, or Firm* — Oblon, Spivak, McClelland, Maier & Neustadt, L.L.P.

(57) ABSTRACT

A device for determining a position of a throttle lever includes position sensors each connected to a primary flight control computer, position sensors each connected to an engine management computer, the position sensors being split into at least three groups of sensors with no common simple failure mode, and at least one interface computer, that includes at least one input to receive measurement information emitted by the computers connected to the position sensors and outputs leading to the engine management computer.

12 Claims, 5 Drawing Sheets

U.S. PATENT DOCUMENTS

| | | | |
|---|---|---|---|
| 7,140,175 B2 * | 11/2006 | Verniau | 60/243 |
| 7,245,289 B2 * | 7/2007 | Matsumoto et al. | 345/161 |
| 7,361,067 B1 * | 4/2008 | Smedema | 440/1 |
| 7,658,349 B2 * | 2/2010 | Abel et al. | 244/223 |
| 7,702,426 B2 * | 4/2010 | Ito et al. | 701/2 |
| 7,805,225 B2 * | 9/2010 | Okuyama et al. | 701/2 |
| 8,074,940 B2 * | 12/2011 | Kopp | 244/229 |
| 8,087,619 B2 * | 1/2012 | Hanlon et al. | 244/223 |
| 2003/0000500 A1 * | 1/2003 | Chatfield | 123/438 |
| 2006/0015231 A1 * | 1/2006 | Yoshimura et al. | 701/48 |
| 2010/0078524 A1 * | 4/2010 | Boczar et al. | 244/235 |
| 2010/0241332 A1 * | 9/2010 | Andrieu | 701/100 |
| 2011/0197700 A1 * | 8/2011 | O'Neill | 74/512 |

* cited by examiner

DEVICE FOR DETERMINING THE POSITION OF A THROTTLE LEVER IN AN AIRCRAFT

This invention relates to a device and a method for determining the position of a throttle lever in an aircraft.

In an aircraft using electrical flight controls, control of the thrust of each engine is provided by the pilot by operating a corresponding throttle lever. Other functions also are controlled from this throttle lever. For flying the aircraft, it therefore is important to determine the position of this lever.

Figure 1:
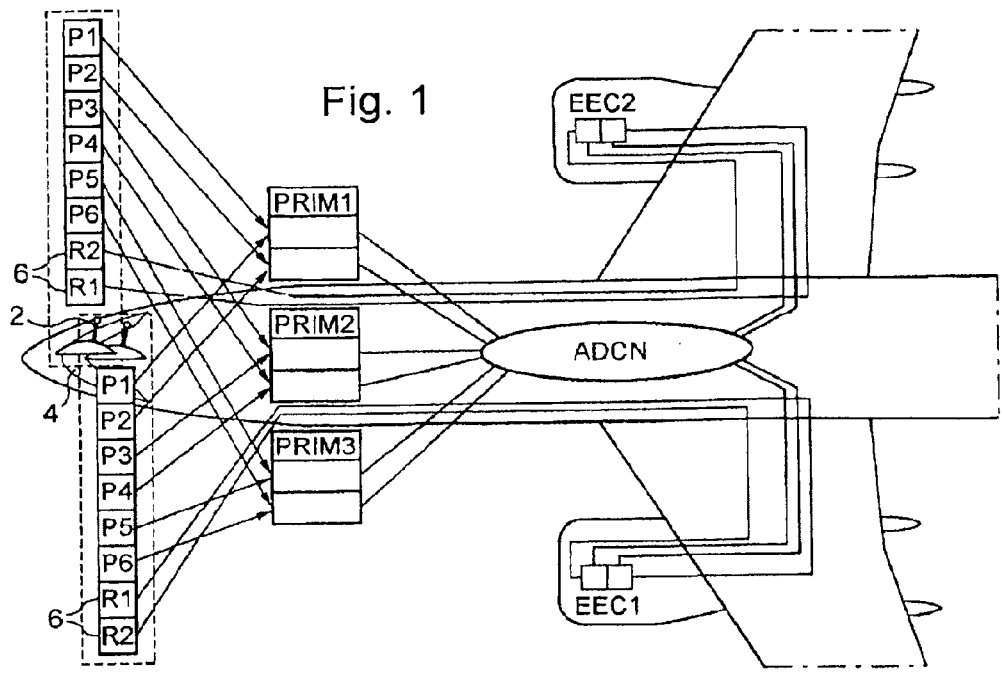

FIG. 1 shows a known architecture of the prior art for a device making it possible to determine the position of a throttle lever of a twin-engine aircraft and to transmit the information to a corresponding engine control computer. In the exemplary embodiment shown on FIG. 1, the aircraft comprises two engines M1 and M2 and two throttle levers 2 are disposed in aircraft cockpit 4.

Position sensors are associated with each throttle lever 2. First of all there are 6 potentiometers P1 to P6 and then two synchro-trigonometers 6. The potentiometers for each throttle lever 2 are connected in pairs to a primary flight control computer. Thus there are three primary flight control computers PRIM1 to PRIM3, each of these computers receiving the signals of two potentiometers of each of throttle levers 2. The information items acquired by these computers then are communicated to a digital network of the aircraft, called ADCN, so as to make them accessible to an engine control computer, called EEC. Since in the embodiment provided on FIG. 1 there are two engines, there are two engine control computers, EEC1 and EEC2. As for synchro-trigonometers 6, they are in a standard architecture of the prior art, connected directly to an engine control computer.

This invention has as an object to provide a new architecture to allow determination of the position of a throttle lever offering advantages in comparison with the architecture set forth above.

One purpose of this invention thus is to reduce the mass of the device. In fact, the use of synchro-trigonometers involves a substantial weight for accomplishment of the function to be performed. First of all, a synchro-trigonometer is a sensor that is connected by means of six wires. Since each sensor is connected to an engine control computer EEC and considering the distance of these computers in relation to cockpit 4 (and therefore to corresponding throttle lever 2), the weight of the wiring is substantial. Then a synchro-trigonometer is a relatively heavy sensor because it uses a technology with coils and a magnetic core.

Another purpose of this invention is to improve the reliability of calculation of the position of the throttle lever. In an architecture such as the one set forth above, when the two synchro-trigonometers of the same throttle lever together provide an erroneous position, corresponding engine control computer EEC then calculates an erroneous position and for this reason the commanded thrust is not the one desired by the pilot.

Another purpose of this invention is to simplify the technology of the sensors and the interface. When synchro-trigonometers are used, it is advisable to supply these sensors with two wires by means of a sinusoidal voltage. Corresponding engine control computer EEC receives from the synchro-trigonometer a signal representative of the cosine of the angle measured by the sensor on two wires and a signal representative of the sine of this angle measured on two other wires. The computer then establishes the ratio of the received signals so as to determine the tangent of the measured angle and by use of the arctangent function finally obtains the value of the measured angle. As is apparent from the above, the interface used is complex and the use of this technology reduces the robustness of the system as a whole.

Another purpose of this invention also is to make it possible to simplify the architecture of a throttle lever. As indicated above, other sensors are present in a throttle lever. The fact of using different technologies for these various sensors makes the whole combination complex.

Another purpose of this invention also is to make the device used for determining the position of a throttle lever less costly.

To this end, this invention proposes a device for determining the position of a throttle lever in an aircraft, comprising on the one hand position sensors each connected to a computer referred to as primary flight control computer and on the other hand position sensors each connected to a computer referred to as engine control computer.

According to this invention, the position sensors are distributed in at least three groups of sensors, and the device comprises at least one computer, referred to as interface computer, having at least one input for receiving measurement information items transmitted by the computers connected to the position sensors as well as at least one output directed to the engine control computer.

Such an architecture allows acquisition of measurement signals from sensors measuring the position of the throttle lever by different computers. These computers, from the received signals, yield measurement information items corresponding to position values of the lever. These measurement information items, or position values, then may be transmitted, in the form of digital information items, by the computers (on the one hand the computers referred to as primary flight control computers and on the other hand by the computers referred to as engine control computers) to one or more computers (referred to as interface computers) by means of a—digital—network generally present in an aircraft. The computer or computers receiving the set of position values then may perform the calculation of the position value of the throttle lever.

With such an architecture, it no longer is necessary to use sensors of the synchro-trigonometer type and it is possible to use only simpler sensors and interfaces, also limiting the number of necessary connecting wires.

In order to simplify this architecture, it may be provided that the interface computers (all or some of them) are integrated into the flight control computers and/or into the engine control computers.

For a greater reliability of the device, the position sensors advantageously are distributed in groups of sensors not having a common simple failure. It is considered that a failure of a sensor is a simple failure when it involves a basic failure that brings about a breakdown of the system or that affects the information delivered by the sensor. After repair of the component having caused such a failure, the sensor reverts to a state of correct operation.

In one embodiment of this invention, it is provided that the position sensors connected to an engine control computer are chosen, for example, from among the group of sensors containing rheostats, the incremental encoder type digital sensors and the potentiometer type analog sensors. As for the position sensors connected to a primary flight control computer, they are, for example, potentiometers.

A preferred embodiment of a device according to the invention comprises two groups of three potentiometers and a group of two rheostats, the potentiometers preferably each being connected to a primary flight control computer and the rheostats each being connected to an engine control computer.

In a concern for reliability in order to increase the security of the device according to this invention, it is provided, for example, that each computer connected to a position sensor comprises at least two channels, and that a single position sensor is associated with each channel of a primary flight control computer and of an engine control computer of the said device, and vice versa.

This invention also relates to a method for determining the position of a throttle lever of an aircraft according to which position sensors measure the angular position of the throttle lever.

According to this invention, this method comprises the following steps:
  acquiring signals originating from sensors through several separate computers,
  transmitting through the said computers, in digital form, position values referred to as sensor position values, determined from measurements made by the position sensors, to at least one computer, referred to as interface computer,
  calculating through each interface computer a position value of the throttle lever, and
  transmitting the position value calculated through each interface computer to a corresponding engine control computer.

A method for using the device described above is involved here. In such a method, the calculation through at least one interface computer preferably comprises the following steps:
  calculating a position value, referred to as group position value, for each group of sensors from position values corresponding to each sensor of the group, then—calculating a position value for the throttle lever according to the group position values.

Concerning these calculations, they advantageously are performed from values or results in agreement with other values or results, that is to say with values or results the relative distance of which is less than a threshold.

Finally, this invention also relates to an aircraft, characterized in that it comprises a throttle lever and a device for determining the position of the said throttle lever such as described above.

Figure 2:
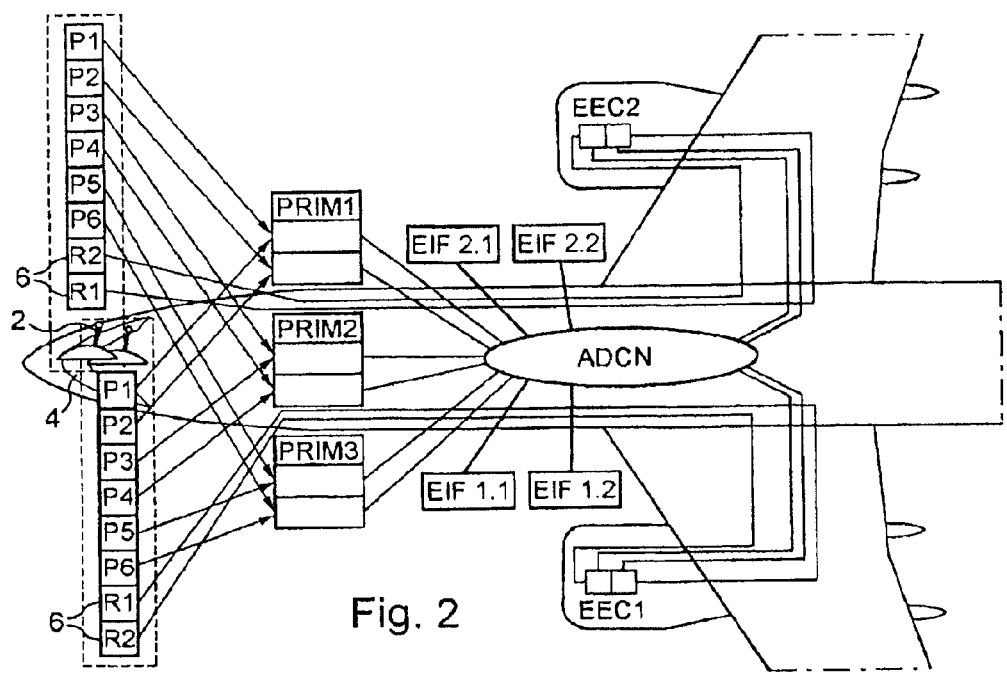
Figure 3:
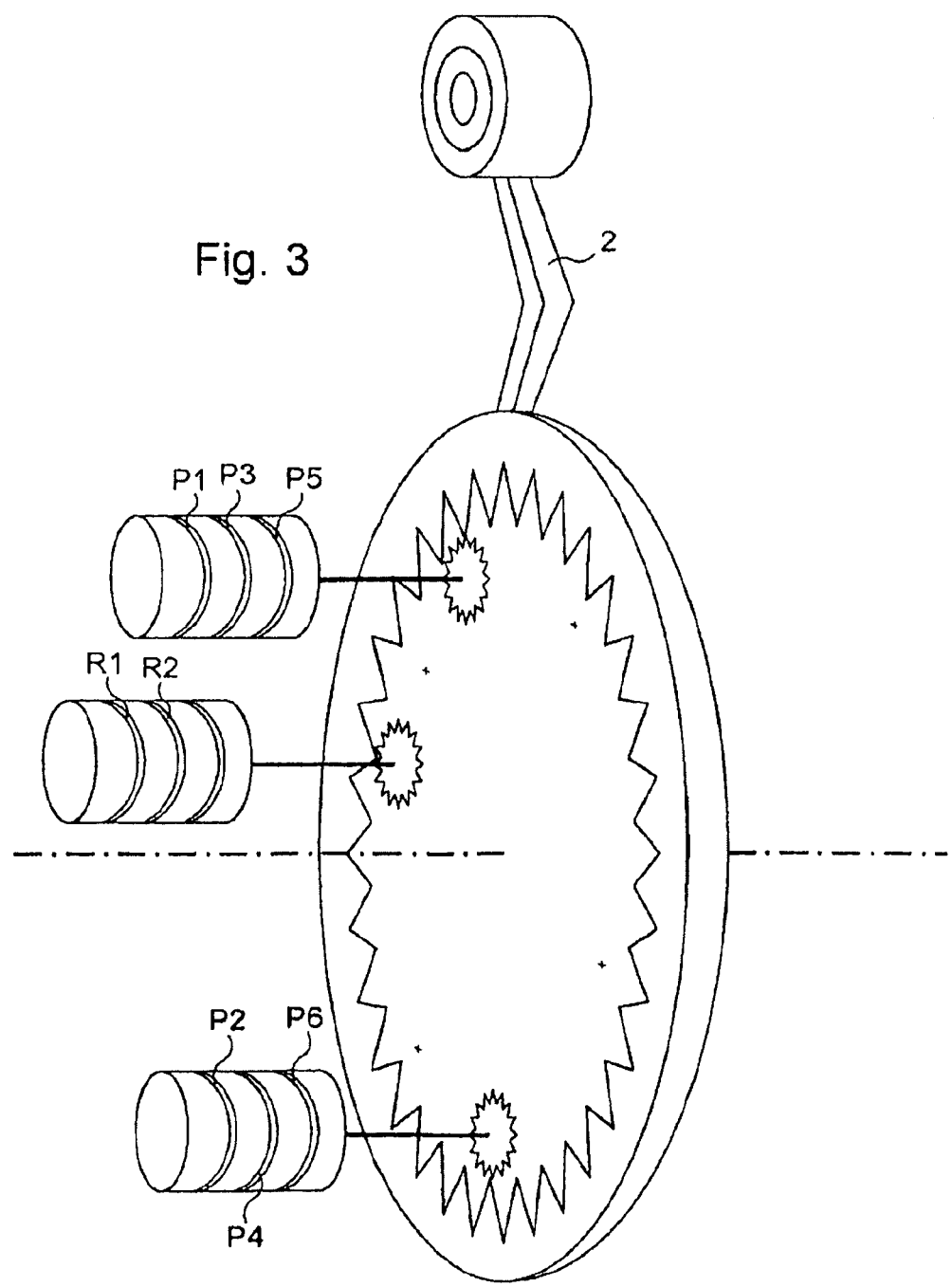
Figure 4:
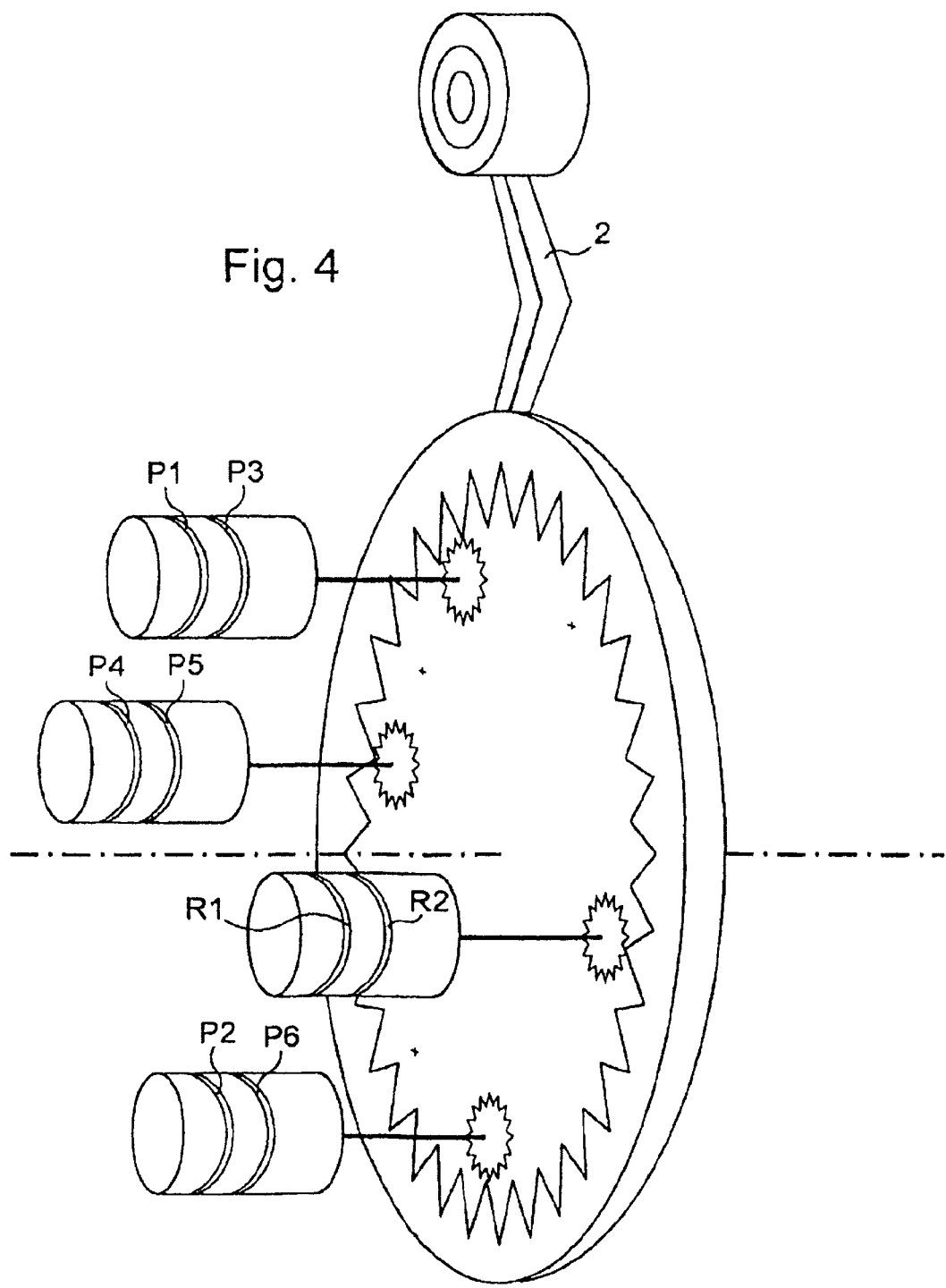
Figure 5:
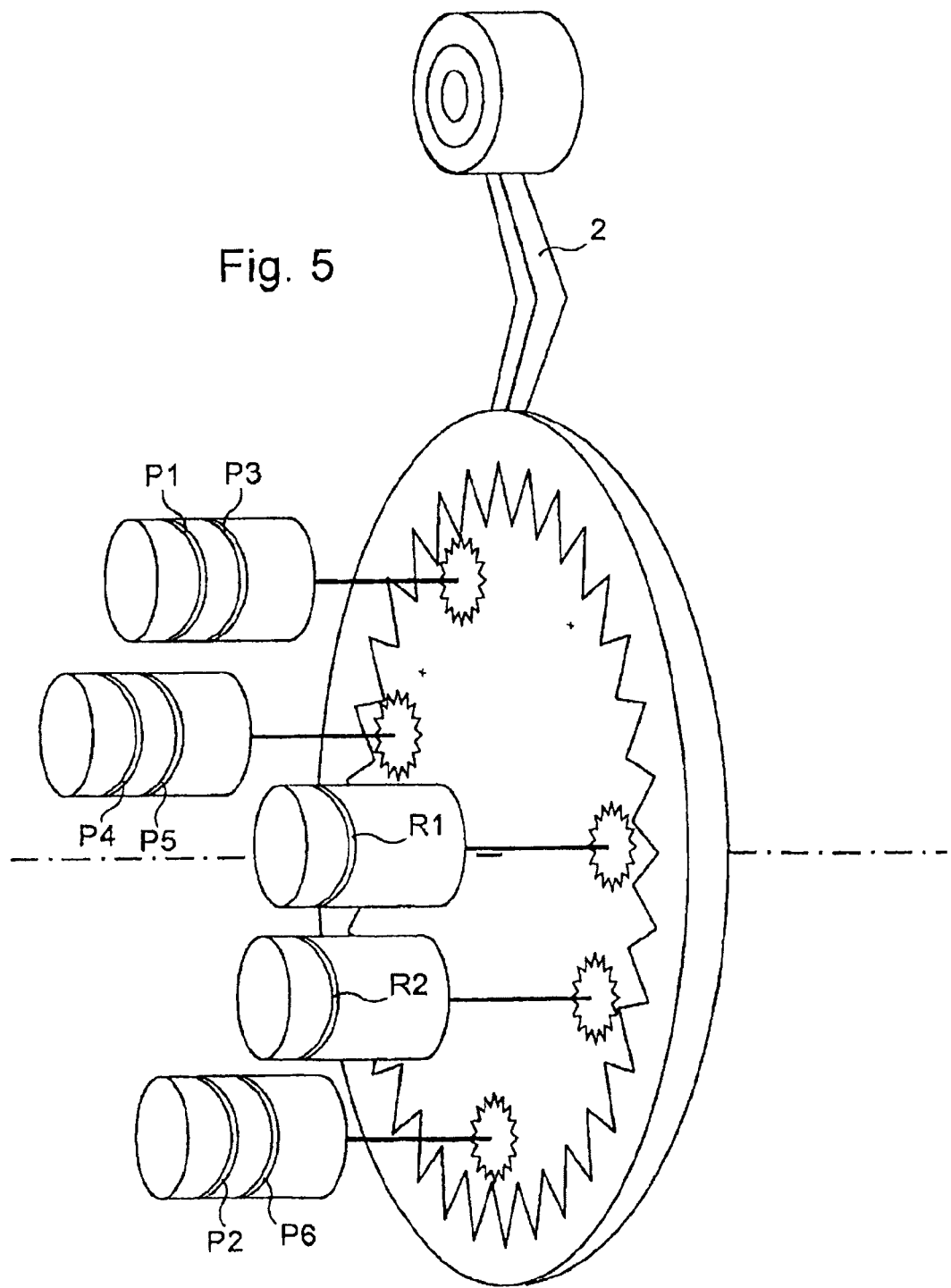
Figure 6:
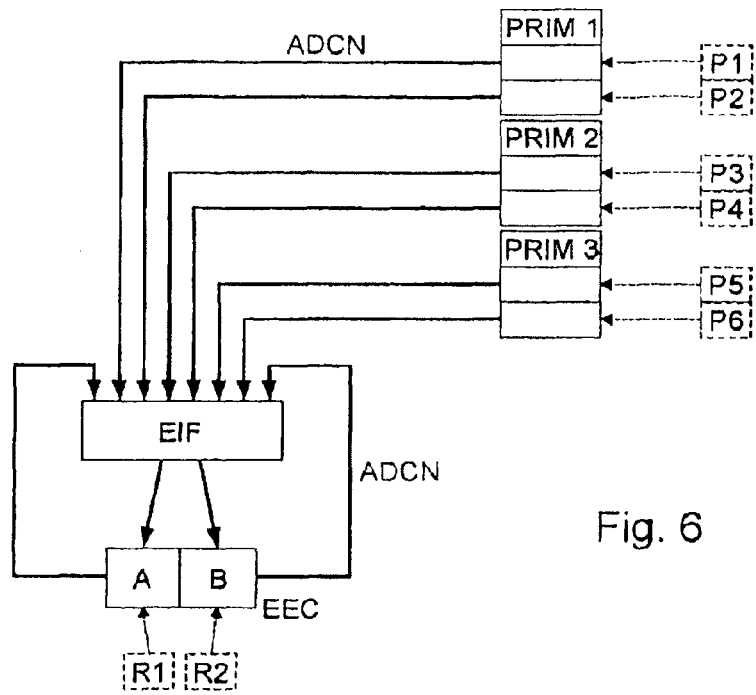
Figure 7:
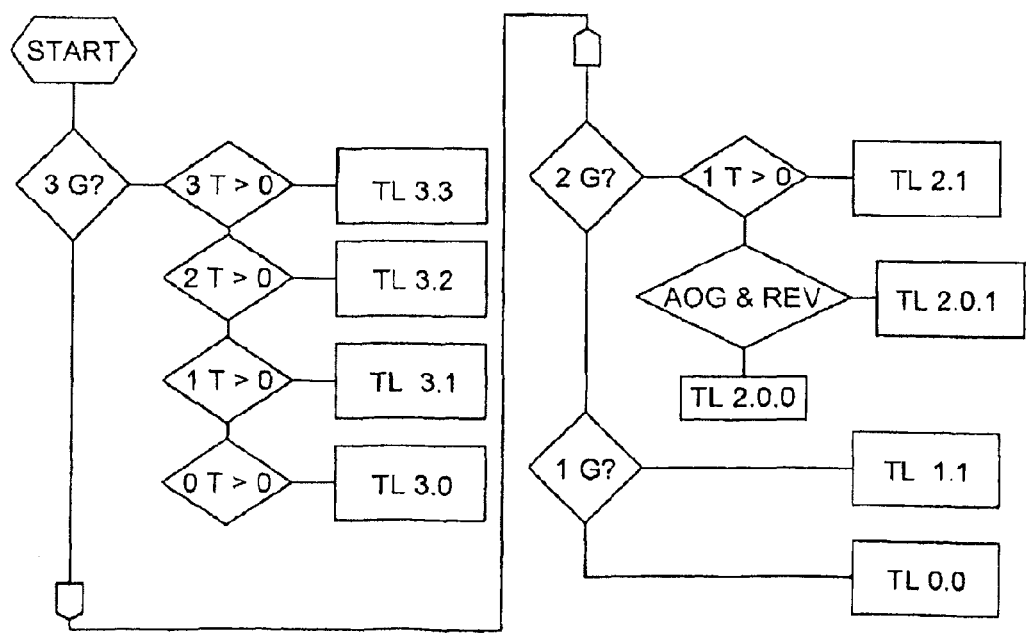

Details and advantages of this invention will become more apparent from the description that follows, provided with reference to the attached schematic drawings on which:

FIG. 1 schematically shows an architecture of a device for determining the position of a throttle lever of an aircraft from the prior art, FIG. 2 is a schematic view corresponding to the view of FIG. 1 schematically showing, in a view from above, a front part of an aircraft as well as a device for determining the position of a throttle lever according to this invention, FIG. 3 schematically shows a throttle lever comprising position sensors brought together in three groups, FIG. 4 schematically shows a throttle lever comprising position sensors brought together in four groups, FIG. 5 schematically shows a throttle lever comprising position sensors brought together in five groups, FIG. 6 shows a communication architecture of a device for determining the position of a throttle lever according to this invention, and FIG. 7 shows an organization diagram illustrating an algorithm for determining the position of the throttle lever in a device according to this invention.

The elements of FIG. 2 similar to elements already shown on FIG. 1 again take up the same references as those used on FIG. 1.

Thus, there is seen again on FIG. 2 a front part of an aircraft with a cockpit 4 in which there are throttle levers 2. In this case, the aircraft shown comprises two engines M1 and M2 and there are two throttle levers 2 in cockpit 4.

Sensors are integrated into each throttle lever 2. Just as on FIG. 1, these sensors are symbolized outside throttle levers 2 for reasons of clarity on FIGS. 1 and 2 but, as suggested in particular on FIGS. 3 to 5, these sensors are disposed inside the mechanism of the corresponding throttle lever. As for the architecture of the prior art shown on FIG. 1, among the sensors used in this embodiment, for each throttle lever 2 there are six potentiometers P1 to P6. In this embodiment, two rheostats R1 and R2 also are provided for each throttle lever 2.

Each sensor, potentiometer or rheostat supplies an electrical signal representative of the position of corresponding throttle lever 2. These electrical signals are acquired through separate computers—as described in greater detail below. The said computers then transmit, in the form of digital information items, the position values, called sensor position values (because they correspond to a measurement made by a sensor) to one or more (other) computers through a digital communication network. Such a communication network usually is present in an aircraft of the type of those affected by this invention. All the computers, or at the very least all those affected here by the determination of the position of a throttle lever 2, are connected to this communication network. The ADCN network indicated in the preamble with reference to FIG. 1 preferably is involved here.

The position sensors, potentiometers and rheostats preferably are disposed in at least three groups. Sensors for which a common simple failure is not detrimental to the operation of the system are placed in the same group. On the other hand, no simple failure is common to half or more of the groups of sensors.

FIGS. 3 to 5 illustrate the possible grouping together of potentiometers P1 to P6 and rheostats R1 and R2 in a throttle lever 2. Each of the sensors measures the angle corresponding to the position of throttle lever 2 with which the sensor is associated.

According to the embodiment of FIG. 3, a first group of sensors brings together potentiometers P1, P3 and P5 ("odd-numbered" potentiometers), a second group brings together potentiometers P2, P4 and P6 ("even-numbered" potentiometers) while the third group brings together the two rheostats R1 and R2.

According to the second embodiment shown on FIG. 4, there is a group of sensors bringing together rheostats R1 and R2 while the potentiometers are grouped together in the following manner P1 with P3, P4 with P5 and P2 with P6.

Finally the third embodiment again takes up the same groups of potentiometers as the second embodiment but here, in comparison with this second embodiment, each rheostat is in a separate group.

These sensor groupings are presented by way of non-limitative illustrative examples. In fact, other groupings are conceivable. Moreover, the number and the nature of the sensors could differ in relation to the embodiments shown on the attached drawings.

In the embodiment of FIG. 2, also corresponding to FIG. 6, it is provided that the signals supplied by potentiometers P1 and P2 are transmitted to a first primary flight control computer PRIM1. Likewise, the signals supplied respectively by potentiometers P3, P4 and P5, P6 are transmitted respectively to a second primary flight control computer PRIM2 and to a third primary flight control computer PRIM3. The signals supplied by rheostats R1 and R2 are transmitted to an engine control computer, called EEC. The position values calculated from signals originating from sensors of a throttle lever 2 are transmitted to the engine control computer of engine M1: this engine control computer here bears the reference EEC1. The signals from the other throttle lever 2 are transmitted to the engine control computer of engine M2: this engine control computer here bears the reference EEC2.

In this embodiment, the architecture of the twin-engine aircraft considered therefore comprises three primary flight control computers (PRIM) and also one engine control computer (EEC) per engine. Each of these computers (PRIM and EEC) possesses two channels, each channel corresponding to a "half-computer." In this way, in the embodiment considered here, each sensor (rheostat or potentiometer) is connected to a channel of a computer. In this exemplary embodiment, a sensor measuring the position of throttle lever 2 of each engine is connected to a channel, or half-computer, of a computer: the potentiometers each are connected to a channel of a primary flight control computer (PRIM) while each rheostat is connected to a channel of an engine control computer (EEC). The potentiometers are connected to the primary flight control computers each time with four wires while the rheostats are connected to the engine control computers each time with two wires.

The present invention also provides, in the preferred embodiment described here in relation to a twin-engine aircraft, for the presence of four interface computers, called EIF, two interface computers being provided here for each engine.

As illustrated on FIG. 6, computers PRIM1, PRIM2, PRIM3 and EEC1 send to an interface computer EIF, through the ADCN network, all the information items on measurement of the position of throttle lever 2 of engine M1. As mentioned above, two interface computers are provided for each engine. All the aforementioned measurement information items, that is to say all the sensor position values, thus are sent to the two interface computers corresponding to engine M1 and called EIF1.1 and EIF1.2.

Likewise, computers PRIM1, PRIM2, PRIM3 and EEC2 send to the two interface computers corresponding to engine M2, through the ADCN network, all the information items on measurement of the position of throttle lever 2 of engine M2. All the aforementioned measurement information items thus are sent to the two interface computers corresponding to engine M2 and called EIF2.1 and EIF2.2.

These interface computers EIF1.1, EIF1.2, EIF2.1 and EIF2.2 each perform the calculation of the position of throttle lever 2 for which they are responsible and this calculated position is provided to each of the two channels of corresponding engine control computer EEC which then undertake the command for thrust of the associated engine.

On FIG. 2, interface computers EIF are shown as being computers separate from engine control computers EEC and primary flight control computers (PRIM). It would not be a departure from the context of the invention if these interface computers were integrated into these other PRIM or EEC computers.

The results of calculations concerning the positions of throttle levers 2 also are transmitted to the entire ADCN digital network and therefore are available not only for engine control but for all the functions that have need therefor, such as, for example, flight controls.

The principle of the position calculation, in a preferred embodiment proposed by this invention, is based, for example, on the concept of values referred to as "in agreement." In accordance with this principle, a position value of the throttle lever measured by a sensor or resulting from the calculation of a position value within a group of sensors is considered "in agreement" with that provided by another sensor or resulting from the calculation of a position value within another group of sensors when the distance, or difference, between these values is less than a threshold. The latter is determined according to the precision and the resolution of the sensors, the precision of the associated mechanics, the electrical connections and the electronics that perform acquisition of the electrical signals of the sensors, potentiometers or rheostats.

Within the same group of sensors, the position values from the sensors are compared two by two. Through these comparisons, one (or more) sub-group(s) of sensor position values that are in agreement with each other is/are determined in this group.

The calculation of a position value within a group of sensors is, for example, the average of the position values of the largest sub-group of values in agreement. The position value calculated here then is called group position value because it corresponds to a value calculated with the aid of measurements performed by a group of sensors.

The overall position value of a throttle lever 2 then may be calculated from the position values of each group according to the principle set forth above: the group position values calculated for each group of sensors are compared two by two and the result providing the overall position value of the lever is obtained by taking the average of the position values of the groups of sensors contained in the largest super-group of groups the position values of which are in agreement.

In the embodiment described with reference to the attached schematic drawings, all interface computers EIF1.1, EIF1.2, EIF2.1 and EIF2.2 contain the same calculation algorithm. Interface computers corresponding to engine M1 use the information items on position of throttle lever 2 corresponding to engine M1 while interface computers corresponding to engine M2 use information items on position of throttle lever 2 corresponding to engine M2.

Each computer (PRIM or EEC) indicates to the interface computers, for each sensor for which it performs acquisition, the determined sensor position value corresponding to the value measured by this sensor and to the validity thereof (may correspond to a type 0 or type 1 binary information item to indicate whether the value is Valid or Invalid).

The calculation of the position of a throttle lever 2 is, for example, performed in the manner described below and partially illustrated by the organization diagram of FIG. 7. This calculation is an exemplary implementation based on the architecture described above for a twin-engine aircraft, for six potentiometers and two rheostats distributed in three groups of sensors per throttle lever 2.

As suggested above, a first step, not illustrated on FIG. 7, consists in calculating a group position value for a group of sensors. In order to be consistent with the preceding description, it is assumed here that a group of sensors comprises at most three sensors C1, C2 and C3. The sensor position values corresponding to the measurements performed respectively by sensors C1, C2 and C3 will be called c1, c2 and c3.

1. The following tests are performed:
   Test 1: $|c1-c2|<T$
   Test 2: $|c1-c3|<T$
   Test 3: $|c2-c3|<T$
   where T is the tolerance, or threshold, indicated above and which is to be calculated in particular according to measurement errors linked to the architecture of the system.
   1.1 If the three tests are positive, that is to say that the absolute values of the differences calculated are less than tolerance T, the average of the sensor position values corresponding to the measurements made by the three sensors then is determined as position value for the group of three sensors. If G is the name of the group, g3.3 is the group position value of the throttle lever corresponding to group G determined with three sensor position values and three positive tests:

$$g3.3=(c1+c2+c3)/3$$

1.2 If only two tests are positive, the sensor position value of the sensor in common with the two positive tests then is determined as position value for the group of three sensors. g3.2 is the group position value corresponding to group G determined with three sensor position values and two positive tests:

$$g3.2=ci, \text{ with } i=1 \text{ or } 2 \text{ or } 3$$

1.3 If only one test is positive, the group position value for group G is the average of the two sensor position values of the sensors for which the test was positive. g3.1 is the group position value corresponding to group G determined with three valid sensor position values and a single positive test:

$$g3.1=(ci+cj)/2, \text{ with } (i,j)=(1,2), (1,3) \text{ or } (2,3)$$

In this case, the third sensor is declared out of order.

1.4 In the case where no test is positive, the group is declared invalid and the three sensors of group G are declared as being out of order.

2 When the group comprises only two sensors, a single test is performed:

Test 1: $|c1-c2|<T$, its being assumed here that the two sensors of the group are sensors C1 and C2.

Tolerance T (which also may be called threshold) remains the same for the same group G of sensors but it may change for another group of sensors.

2.1 If the test is positive, similarly to what was described above, the group position value for the corresponding group is the average of the sensor position values supplied by the two sensors. Thus one has:

$$g2.1=(c1+c2)/2$$

2.2 If the test is negative, the sensor position values supplied from measurements made by sensors C1 and C2 are compared with the overall position of the throttle lever calculated previously, that is to say with the last result obtained by the interface computer. If one of the two sensor position values is in agreement with this overall position, the sensor position value in agreement with the preceding overall position is chosen for the group position value of the group of sensors considered.

Otherwise, the group is declared invalid and all the sensors are declared out of order.

FIG. 7 illustrates the algorithm for calculation of the overall position value of throttle lever 2, that is to say the position value calculated by taking into account all the measurements made by the sensors corresponding to this throttle lever 2. This overall position value is called TL. This algorithm begins in the box called START.

There then is found a procedure similar to the one used for determining the group position value for a group of sensors. Instead of determining a group position value from sensor position values, an overall position value corresponding to the calculated position of the throttle lever considered is determined from group position values.

3.1 If three groups of sensors are valid (box "3G?" of the organization diagram of FIG. 7), that is to say that a group position value was determined for these three groups, tests are performed.

If the groups are called G1, G2 and G3, and the corresponding group position values are respectively g1, g2 and g3, tests are performed just as before for the sensor position values. Thus one has:

Test 1: $|g1-g2|<Tg$
Test 2: $|g1-g3|<Tg$
Test 3: $|g2-g3|<Tg$ where Tg is a tolerance adapted for the groups and which is to be calculated in particular according to measurement errors linked to the architecture of the system.

3.1.1 If the three tests are positive (box "3T>0"), that is to say that the absolute values of the differences calculated are less than tolerance Tg, the average of the group position values of the three groups then is determined as overall position value for corresponding throttle lever 2. TL3.3 is the overall position value of this throttle lever determined with three valid groups and three positive tests:

$$TL3.3=(g1+g2+g3)/3$$

3.1.2 If only two tests are positive (box "2T>0"), the group position value of the group in common with the two positive tests then is determined as overall position value for corresponding throttle lever 2. TL3.2 is the value of the overall position of this throttle lever determined with three valid groups and two positive tests:

$$TL3.2=gi, \text{ with } i=1 \text{ or } 2 \text{ or } 3$$

3.1.3 If only one test is positive (box "1T>0"), the overall position value for corresponding throttle lever 2 is the average of the two group position values of the groups for which the test was positive. TL3.1 is the overall position value of this throttle lever determined with three valid measurements and a single positive test:

$$TL3.1=(gi+gj)/2, \text{ with } (i,j)=(1,2), (1,3) \text{ or } (2,3)$$

3.1.4 In the case in which no test is positive (box "0T>0"), the lever (here called TL3.0) is considered as being in its forward idle (in English: forward idle) position.

3.2 When two groups of sensors are valid (box "2G?"), a single test is performed:

Test 1: $|g1-g2|<Tg$, its being assumed here that the two valid groups are groups G1 and G2.

Tolerance Tg remains the same as for the tests performed when three groups of sensors are valid.

3.2.1 If the test is positive, similarly to what was described above, the overall position value for throttle lever 2 is the average of the group position values supplied by the two groups. Thus one has:

$$TL2.1=(g1+g2)/2$$

3.2.2 If the test is negative, another test is performed. It then is a matter of determining whether the corresponding aircraft is on the ground (AOG) AND whether the last position of the throttle lever corresponds to a thrust reversing (REV) position. If the latter test—concerning the two conditions—is positive, it then is considered that the position of the lever (here called TL2.0.1) is the reverse idle (in English: reverse idle) position. On the other hand, if the latter test is negative, the lever (here called TL2.0.0) is considered as being in its forward idle (in English: forward idle) position.

3.3 When a single group of sensors is valid (box "1G?"), the group position value of this group of sensors becomes the overall position value of the throttle lever, or therefore TL=gi, with i=1 or 2 or 3.

3.4 When no group of sensors is valid (box "0G"), the overall position value of the throttle lever cannot be determined and the overall position value is considered as invalid.

The implementation of the architecture presented above allows a reliable calculation of the position of a throttle lever by using, for example, the calculation method described above. This description is given for a twin-engine aircraft and providing three groups of sensors per throttle lever. The individual skilled in the art will know how to adapt the presented architecture and the proposed calculation method to another configuration, with a different number of engines and/or different sensors and/or a different distribution of sensors. The above description provides eight sensors per lever, but this invention also functions with a different number of sensors. The number of sensors—per lever—preferably will be greater than four. Likewise, the number of groups of sensors may be different, nonetheless preferably providing at least three groups of sensors. The number of sensors per group also may be adapted and here it is possible to have only a single sensor in a group.

The architecture proposed here makes it possible to achieve an appreciable reduction in mass in comparison with the architecture described in the preamble and in which two synchro-trigonometers are used as sensors and each connected by six wires to an engine control computer. The mass of the cables involved here may be divided by 6 in comparison with the state of the art presented, on the one hand because of the decrease in wires connecting the sensors concerned to the engine control computer and on the other hand because of the different nature of the wires used.

The fact of using rheostats instead of synchro-trigonometers also makes it possible to limit the mass of the device because a rheostat is approximate two times lighter than a synchro-trigonometer. Moreover, a rheostat offers the advantage of being less costly than a synchro-trigonometer.

It also is possible to use other types of position sensors for the throttle lever, in particular as regards sensors connected to an engine control computer. Any type of angular measurement sensor may be involved. These sensors may be digital sensors connected on two, three, four or five wires and be of incremental encoder or other type. It also is possible to have analog sensors connected on two, three, four or five wires, of potentiometer, or other, even trigonometer, type.

Acquisition by an engine control computer of a signal originating from a rheostat is accomplished by a simple measurement of direct current which is the direct image of the angular position of the sensor—rheostat—while acquisition from a synchro-trigonometer requires processing of two alternating voltages then a processing—arctangent calculation—to obtain a value of the angular position of the corresponding sensor.

It also is noted that the feed for the rheostat through the engine control computer is achieved with a simple direct voltage while it is necessary to generate an alternating voltage with a very stable frequency for a synchro-trigonometer.

The proposed logic for calculating the position of the throttle lever makes it possible to have a simple failure common to the two sensors connected to the engine control computer without weakening the security required for calculation of this position, which is an improvement in comparison with the embodiment of the prior art presented with reference to FIG. 1.

This invention therefore makes is possible to simplify the architecture of the device for determining the position of a throttle lever of an aircraft which, in comparison with the known devices of the prior art, is lighter, uses a simpler technology, is less costly, is more reliable and also makes it possible to simplify the mechanical architecture of the throttle lever concerned.

This invention is not limited to the preferred embodiment described above by way of non-limitative example and the variants indicated. It also relates to all the embodiment variants within the capacity of the individual skilled in the art in the context of the claims below.

The invention claimed is:

1. A device for determining a position of a throttle lever in an aircraft, comprising:
position sensors each connected to a primary flight control computer, and position sensors each connected to an engine control computer, wherein the position sensors are distributed in at least three groups of sensors such that at least one group includes at least two sensors; and
at least one interface computer, including at least one input that receives measurement information items transmitted by the primary flight control computer and engine control computer connected to the position sensors, and at least one output directed to the engine control computer, the at least one interface computer calculating a group position value for each group of sensors from the sensor position values corresponding to each sensor of the group, and calculating a position value of the throttle lever based on the group position values, the at least one interface computer calculating the group position value by comparing differences between the sensor position values to a threshold.

2. The device according to claim 1, wherein the position sensors connected to the engine control computer are chosen from among sensors of rheostats, incremental encoder digital sensors, and potentiometer analog sensors.

3. The device according to claim 1, wherein the position sensors connected to a primary flight control computer are potentiometers.

4. The device according to claim 1, further comprising two groups of three potentiometers each and a group of two rheostats, wherein the potentiometers each are connected to the primary flight control computer and the rheostats each are connected to the engine control computer.

5. The device according to claim 1, wherein each computer connected to a position sensor comprises at least two channels, and a single position sensor is associated with each channel of a primary flight control computer and of the engine control computer of the device, and vice versa.

6. The device according to claim 1, wherein, if there are only two sensors in the group, the at least one interface computer calculates the group position value by averaging the sensor position values if a difference between the sensor position values is less than the threshold, and if the difference is greater than the threshold, invalidates the sensor position values for the group.

7. The device according to claim 1, wherein, if there are three sensors in the group, the at least one interface computer calculates a difference between the sensor position values for each of three pairs of sensors, and if all three differences are less than the threshold, calculates the group position value by averaging the sensor position values of the three sensors, if only two differences are less than the threshold, selects the sensor position value of a common sensor from the two differences as the group position value, if only one difference is less than the threshold, averages the two sensor value in the pair with the one difference as the group position value, and if none of the differences are less than the threshold, invalidates the sensor position values for the group.

8. An aircraft, comprising a throttle lever and a device for determining the position of the throttle lever according to claim 1.

9. A method for determining a position of a throttle lever of an aircraft according to which position sensors measure an angular position of a throttle lever, the method comprising: acquiring signals originating from the position sensors through plural separate computers, the position sensors arranged in groups such that at least one group includes at least two sensors; transmitting, through the computers, in digital form, sensor position values determined from measurements made by the position sensors, to at least one interface computer; calculating a group position value for each group of sensors from the sensor position values corresponding to each sensor of the group, the calculating the group position value including comparing differences between the sensor position values to a threshold; calculating, through each interface computer, a position value of the throttle lever based on the group position values; and transmitting the position value calculated by each interface computer to a corresponding engine control computer.

10. The method according to claim 9, wherein the calculations are performed from values or results in agreement with other values or results, with values or results the relative distance of which is less than a threshold.

11. The method according to claim 9, wherein, if there are only two sensors in the group, the at least one interface computer calculates the group position value by averaging the sensor position values if a difference between the sensor position values is less than the threshold, and if the difference is greater than the threshold, invalidates the sensor position values for the group.

12. The method according to claim 9, wherein, if there are three sensors in the group, the at least one interface computer calculates a difference between the sensor position values for each of three pairs of sensors, and if all three differences are less than the threshold, calculates the group position value by averaging the sensor position values of the three sensors, if only two differences are less than the threshold, selects the sensor position value of a common sensor from the two differences as the group position value, if only one difference is less than the threshold, averages the two sensor value in the pair with the one difference as the group position value, and if none of the differences are less than the threshold, invalidates the sensor position values for the group.

* * * * *